(12) United States Patent
Wang

(10) Patent No.: US 11,996,124 B2
(45) Date of Patent: May 28, 2024

(54) VIDEO PROCESSING METHOD, APPARATUS, READABLE MEDIUM AND ELECTRONIC DEVICE

(71) Applicant: Beijing Bytedance Network Technology Co., Ltd., Beijing (CN)

(72) Inventor: Yan Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/819,238

(22) Filed: Aug. 11, 2022

(65) Prior Publication Data

US 2022/0383910 A1    Dec. 1, 2022

Related U.S. Application Data

(63) Continuation of application No. PCT/CN2021/076409, filed on Feb. 9, 2021.

(30) Foreign Application Priority Data

Feb. 11, 2020   (CN) .......................... 202010087010.9

(51) Int. Cl.
   *G11B 27/34*    (2006.01)
   *G11B 27/36*    (2006.01)
   (Continued)

(52) U.S. Cl.
   CPC .............. *G11B 27/34* (2013.01); *G11B 27/36* (2013.01); *H04N 21/47205* (2013.01); *H04N 21/8456* (2013.01)

(58) Field of Classification Search
   CPC .. G11B 27/34; G11B 27/36; H04N 21/47205; H04N 21/8456
   See application file for complete search history.

(56) References Cited

U.S. PATENT DOCUMENTS 7,483,618 B1 *   1/2009   Edwards .............. G11B 27/034
                                                386/278
2016/0037176 A1 *   2/2016   Chari ............... H04N 21/23439
                                                375/240.26
(Continued)

FOREIGN PATENT DOCUMENTS

CN         103945219 A      7/2014
CN         104778230 A      7/2015
(Continued)

OTHER PUBLICATIONS

International Search Report and Written Opinion for International Patent Application No. PCT/CN2021/076409, dated Apr. 15, 2021 (23 pages).

(Continued)

*Primary Examiner* — Girumsew Wendmagegn
(74) *Attorney, Agent, or Firm* — Astute IP Law Group

(57) ABSTRACT

The present disclosure relates to a video processing method and apparatus, a readable medium and an electronic device. The method includes: dividing a target video to obtain a target video clip; determining, according to video frame images contained in the target video clip, a quality score corresponding to the target video clip; displaying the quality score corresponding to the target video clip at a time position corresponding to the target video clip on a quality score display timeline, where the time position corresponding to the target video clip is a time position where the target video clip appears in the target video. Thus, it can provide a user with a visual display result about the quality score of the target video clip, and provide a reference for the user's video clip selection, which saves the time the user spends viewing the target video clip.

16 Claims, 7 Drawing Sheets

(51) Int. Cl.
   *H04N 21/472*  (2011.01)
   *H04N 21/845*  (2011.01)

(56) References Cited

U.S. PATENT DOCUMENTS

| | | | |
|---|---|---|---|
| 2019/0095961 A1* | 3/2019 | Wu | G06Q 30/0255 |
| 2019/0188479 A1 | 6/2019 | Balasubramanian et al. | |
| 2021/0027065 A1* | 1/2021 | Chung | G06N 20/00 |
| 2021/0144442 A1* | 5/2021 | Liu | G06N 3/045 |

FOREIGN PATENT DOCUMENTS

| | | |
|---|---|---|
| CN | 104780454 A | 7/2015 |
| CN | 105493512 A | 4/2016 |
| CN | 106210902 A | 12/2016 |
| CN | 106993227 A | 7/2017 |
| CN | 108156528 A | 6/2018 |
| CN | 108198177 A | 6/2018 |
| CN | 109587578 A | 4/2019 |
| CN | 109819338 A | 5/2019 |
| CN | 109963164 A | 7/2019 |
| CN | 110516749 A | 11/2019 |
| CN | 110650374 A | 1/2020 |
| CN | 110753246 A | 2/2020 |

OTHER PUBLICATIONS

First Office Action for Chinese Patent Application No. 202010087010.9, dated Nov. 26, 2021 (21 pages).
Second Office Action for Chinese Patent Application No. 202010087010.9, dated May 25, 2022 (19 pages).
Notice of Rejection for Chinese Patent Application No. 202010087010.9, dated Oct. 10, 2022 (24 pages).

* cited by examiner

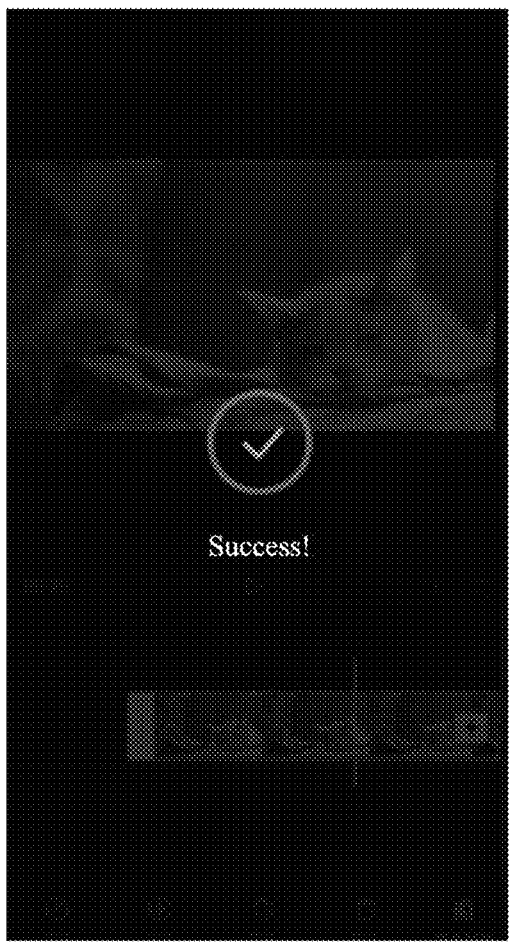
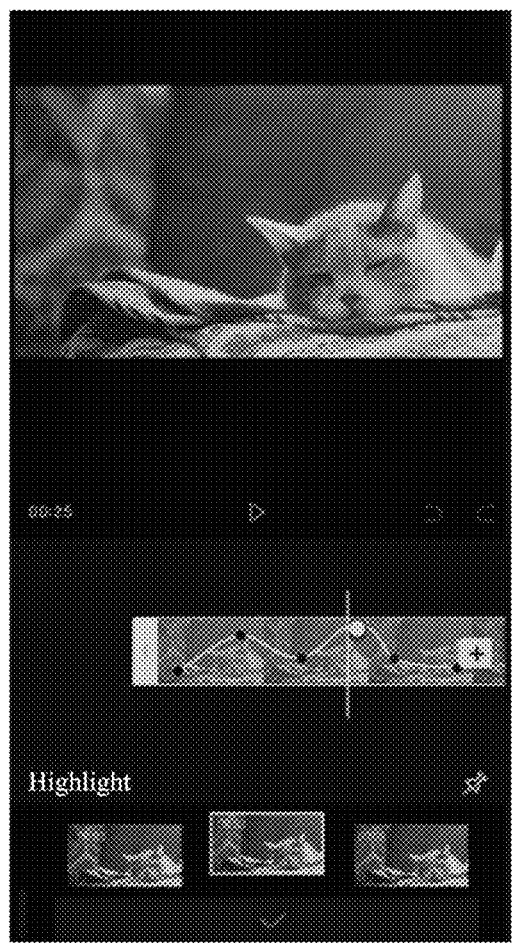
FIG. 4C
FIG. 4D

VIDEO PROCESSING METHOD, APPARATUS, READABLE MEDIUM AND ELECTRONIC DEVICE

CROSS-REFERENCE TO RELATED APPLICATIONS

This application is a continuation of International Application No. PCT/CN2021/076409, filed on Feb. 9, 2021, which claims priority to Chinese Patent Application No. 202010087010.9 titled "VIDEO PROCESSING METHOD, APPARATUS, READABLE MEDIUM AND ELECTRONIC DEVICE", and was filed with China National Intellectual Property Administration on Feb. 11, 2020. The disclosures of the aforementioned applications are incorporated herein by reference in their entireties.

TECHNICAL FIELD

The present disclosure relates to the field of computer technology, and in particular, to a video processing method and apparatus, a readable medium, and an electronic device.

BACKGROUND

In a video editing scenario, a user needs to select a shorter video clip from a longer video when editing a video. In general, the user needs to view an original video frame by frame and filter out suitable parts from it. However, in the case of a long original video, a user needs to spend a lot of time in the process of selecting video clips manually, which is not only labor-intensive and time-consuming, but also inefficient.

SUMMARY

Summary section is provided in order to introduce concepts in a brief form, which will be described in detail in the following Description of Embodiments section. The Summary section is not intended to identify key features or essential features of the technical solution required to be protected, nor is it intended to limit the scope of the technical solution required to be protected.

In a first aspect, the present disclosure provides a video processing method, including:
dividing a target video to obtain a target video clip;
determining, according to video frame images contained in the target video clip, a quality score corresponding to the target video clip;
displaying the quality score corresponding to the target video clip at a time position corresponding to the target video clip on a quality score display timeline, where the time position corresponding to the target video clip is a time position where the target video clip appears in the target video.

In a second aspect, the present disclosure provides a video processing apparatus, including:
a dividing module, configured to divide a target video to obtain a target video clip;
a first determining module, configured to determine, according to video frame images contained in the target video clip, a quality score corresponding to the target video clip;
a first displaying module, configured to display the quality score corresponding to the target video clip at a time position corresponding to the target video clip on a quality score display timeline, where the time position corresponding to the target video clip is a time position where the target video clip appears in the target video.

In a third aspect, the present disclosure provides a computer-readable medium on which a computer program is stored, when the program is executed by a processing apparatus, the steps of the method described in the first aspect of the present disclosure is implemented.

In a fourth aspect, the present disclosure provides an electronic device, including:
a storage apparatus, on which a computer program is stored;
a processing apparatus, configured to execute the computer program in the storage apparatus, to implement the steps of the method described in the first aspect of the present disclosure.

In a fifth aspect, the present disclosure provides a computer program product, including: a computer program, which, when executed by a processing apparatus, the steps of the method described in the first aspect of the present disclosure are implemented.

In a sixth aspect, the present disclosure provides a computer program, when the computer program is executed by a processing apparatus, the steps of the method described in the first aspect of the present disclosure are implemented.

Through the above technical solution, dividing a target video to obtain a target video clip, and determining a quality score corresponding to the target video clip according to video frame images contained in the target video clip, and displaying the quality score corresponding to the target video clip at a time position corresponding to the target video clip on a quality score display timeline. That is, after obtaining the quality score corresponding to the target video clip in the target video, the quality score corresponding to the target video clip can be displayed at a corresponding position of the quality score display timeline. Thus, it can provide a user with visual display results about the quality scores of the target video clip for the user to view, which is convenient for the user to quickly know the quality score corresponding to the target video clip, so as to provide a reference for the user's video clip selection, and save the time the user spends viewing the target video clip. In addition, based on the above solution, the quality scores corresponding to each of the plurality of video clips in the target video can be determined and displayed, so as to form an intuitive comparison of the quality scores of the plurality of video clips, provide a reference for the user to select video clips from the target video, and facilitate the user to quickly select video clips.

Other features and advantages of the present disclosure will be described in detail in the following Description of Embodiments section.

BRIEF DESCRIPTION OF DRAWINGS

In combination with the accompanying drawings and with reference to the following specific embodiments, the above and other features, advantages and aspects of the embodiments of the present disclosure will become more apparent. Throughout the accompanying drawings, the same or similar reference signs represent the same or similar elements. It should be understood that the accompanying drawings are schematic and that the originals and elements are not necessarily drawn to scale. In the accompanying drawings:

FIG. 4A-4E are several exemplary schematic diagrams shown by a client in a video processing method according to the present disclosure;

DESCRIPTION OF EMBODIMENTS

Figure 1:
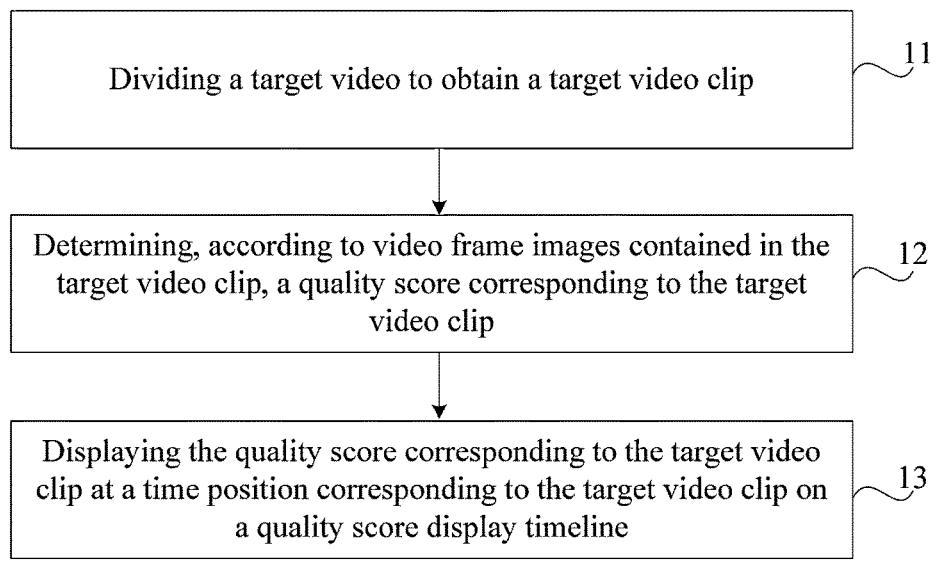
FIG. 1 is a flowchart of a video processing method according to an implementation of the present disclosure.

Embodiments of the present disclosure will be described in more detail below with reference to the accompanying drawings. Although some embodiments of the present disclosure are shown in the accompanying drawings, it should be understood that the present disclosure can be implemented in various forms and should not be interpreted as being limited to the embodiments set forth herein. On the contrary, these embodiments are provided for a more thorough and complete understanding of the present disclosure. It should be understood that the accompanying drawings and embodiments of the present disclosure are only for exemplary purposes and are not intended to limit the protection scope of the present disclosure.

It should be understood that various steps described in the method implementations of the present disclosure may be performed in different orders and/or in parallel. Furthermore, method implementations may include additional steps and/or omit performing the shown steps. The scope of the present disclosure is not limited in this regard.

The term "including" and variations thereof used herein are opening inclusions, that is, "including but not limited to". The term "based on" is "at least partially based on". The term "one embodiment" means "at least one embodiment"; the term "another embodiment" means "at least one additional embodiment"; the term "some embodiments" means "at least some embodiments". Relevant definitions of other terms will be given in the following description.

It should be noted that concepts such as "first" and "second" and the like mentioned in the present disclosure are only used to distinguish different apparatuses, modules or units, and are not used to limit the order or interdependence of functions performed by these apparatuses, modules or units.

It should be noted that the modifications of "one" and "a plurality of" mentioned in the present disclosure are schematic rather than restrictive, and those skilled in the art should understand that unless the context clearly indicates, otherwise, the terms should be understood as "one or a plurality of".

The names of messages or information exchanged between a plurality of apparatuses in the implementations of the present disclosure are only for illustrative purposes, and are not intended to limit the scope of these messages or information.

The present disclosure provides a video processing method and apparatus, a readable medium, and electronic device. By dividing a target video to obtain a target video clip; determining a quality score corresponding to the target video clip according to video frame images contained in the target video clip; and displaying the quality score corresponding to the target video clip at a time position corresponding to the target video clip on a quality score display timeline, so that, a visual display result about the quality score of the target video clip is provided for a user to view, so as to solve the problem of low efficiency of the user manually selects the video clip in the prior art.

In the field of audio/video processing, generally speaking, audio/video editing includes a three-layer structure, namely a business layer (frontend), a SDK layer (middle platform), and an algorithm layer (backend). In which, SDK is an abbreviation of Software Development Kit. The business layer is responsible for receiving user operations, that is, a client; the SDK layer is responsible for data transmission, such as transferring the data to be processed to the algorithm layer to acquire a processing result of the algorithm layer, and further process the data according to the obtained processing result. For example, the SDK layer can be responsible for frame extraction, encoding and decoding, transmission, etc. of audio/video, and at the same time, the SDK layer can set a processing strategy for data; the algorithm layer is responsible for processing incoming data from the SDK layer and outputting the obtained processing result to the SDK layer.

The method provided in the present disclosure is mainly applied to a video editing scenario, and relevant algorithms used in the present disclosure are integrated in the algorithm layer. Data processing steps in the method provided in the present disclosure can be performed by the SDK layer (middle platform), and a final data processing result (for example, a quality score) can be displayed on the client.

FIG. 1 is a flowchart of a video processing method according to an implementations of the present disclosure. As shown in FIG. 1, the method may include the following steps.

In step 11, dividing a target video to obtain a target video clip.

The target video is a video that a user needs to edit the video. In other words, from which video the user desires to select a video clip, the video can be used as the target video, and a series of steps in the video processing method provided by the present disclosure can be executed. In practical application, the user can determine the target video through a visual interface of the device (e.g., terminal).

The target video clip may include one frame of video frame image or a plurality of frames of video frame images. Unless otherwise specified, "a plurality of" in this solution refers to two or more than two, and correspondingly, "a plurality of frames" refers to two or more frames.

In a possible implementation, the division of the target video may be based on a slicing algorithm obtained by pre-training, and accordingly, step 11 may include the following steps:

inputting a plurality of frames of target video frame images at different time positions in the target video and times when the plurality of frames of target video frame images appear in the target video into a slicing algorithm to acquire a target segmentation time point output by the slicing algorithm;

dividing, according to the target segmentation time point, the target video to obtain a plurality of video clips including the target video clip.

The slicing algorithm can be obtained by training a machine learning algorithm with first training data. The first training data may include a first historical video and a historical segmentation time point for dividing the first historical video. The historical segmentation time point used to divide the first historical video may be marked by the user.

Exemplarily, the user can mark the historical segmentation time point for the first historical video from a perspective of the screen body, screen color, screen similarity, position change of screen content, etc. For example, if in a first historical video A, screen color of a video frame image A2 after a video frame image A1 is quite different from that of the video frame image A1, the user can take a time point corresponding to the video frame image A1 in the first historical video A as one of the historical segmentation time points of the first historical video A.

In a training process, one first historical video is used as input data each time, and a historical segmentation time point corresponding to the first historical video is used as output data to train the machine learning algorithm. After many times of trainings, the algorithm can learn screen change characteristics of the video frame images before and after the historical segmentation time point in the first historical video, that is, image characteristics corresponding to the "screen transition". Therefore, a final obtained slicing algorithm has an ability to recognize this "screen transition", which can determine video frame images suitable for being used as dividing points based on the video frame images in the input video, and take a time point in the input video where a video frame image suitable for being used as a dividing point is located (that is, a time point suitable for cutting in the input video) as an output of the slicing algorithm.

It should be noted that the process of training the machine learning algorithm is common knowledge in the field, and will not be described in detail herein.

Therefore, after inputting the plurality of frames of target video frame images at different time positions in the target video and the times when the plurality of frames of target video frame images appear in the target video into the slicing algorithm, the target segmentation time point output by the slicing algorithm can be acquired. The plurality of frames of target video frame images at different time positions in the target video may include all video frame images in the target video, so as to ensure the accuracy of the output result of the slicing algorithm. Alternatively, one or more frames of video frame images can be extracted from the video frame images at various time positions in the target video respectively as the plurality of frames of target video frame images at different time positions in the target video, so as to reduce the data processing pressure of the slicing algorithm.

After that, after dividing the target video according to the target segmentation time point, a plurality of video clips including the target video clip can be obtained. Similar to the target video clip, among the plurality of video clips obtained by dividing the target video based on the target segmentation time point, each video clip may include one frame of video frame image or a plurality of frames of video frame images. For a same target video, the plurality of video clips obtained by division including the target video clip may only have a video clip containing one frame of video frame image, or only a video clip containing a plurality of frames of video frame images, or both a video clip containing one frame of video frame image and a video clip containing a plurality of frames of video frame images.

In the above manner, using the slicing algorithm based on training the machine learning algorithm, the target segmentation time point corresponding to the target video can be quickly obtained. Therefore, the target video can be divided according to the target segmentation time point, and a plurality of video clips including the target video clip can be obtained, so as to speed up the speed of obtaining the target video clip.

In another possible implementation, each frame of the video frame image of the target video can also be directly used as a video clip, that is, each video clip corresponds to one frame of video frame image of the target video. Therefore, the target video clip is one frame of video frame image in the target video.

In step 12, determining, according to video frame images contained in the target video clip, a quality score corresponding to the target video clip.

The quality score of the video clip can reflect the performance of the video clip under a preset effect measurement dimension. The preset effect measurement dimension may include but are not limited to the following: richness of a screen, brilliance of a screen, prominence of a main body in a screen, a degree of light change, a degree of movement change, aesthetic quality, and composition quality. For example, if a difference between a character and a background in a video clip is obvious (that is, the prominence of the main body in the screen is high), the video clip corresponds to a higher quality score, while if a difference between a character and a background in a video clip is small (that is, the prominence of the main body in the screen is low), the video clip corresponds to a lower quality score. For another example, if content of a screen in a video clip is rich (that is, the richness of the screen is high), the video clip corresponds to a higher quality score, while if content of a screen in a video clip is single (that is, the richness of the screen is low), the video clip corresponds to a lower quality score.

In a possible implementation, the quality score corresponding to the target video segment may be determined in the following manner:

inputting the video frame images contained in the target video clips into a first quality evaluation model to acquire the quality score corresponding to the target video clip.

The first quality evaluation model is obtained by training with second training data, for example, by training a machine learning algorithm with the second training data. The second training data includes a second historical video and a historical quality score corresponding to the second historical video. In a training process, a second historical video is used as input data, and a historical quality score corresponding to the second historical video is used as output data, and training is performed based on a machine learning algorithm to obtain a first quality evaluation model.

Exemplarily, the historical quality score corresponding to the second historical video is determined by at least one of the following:

a first score determined according to a user's mark score for the second historical video;

a second score determined according to a resolution rate of the second historical video, where the second score of the second historical video is positively correlated with the resolution rate of the second historical video;

a third score determined according to a position of a first object in a screen of the second historical video, where the third score of the second historical video is negatively correlated with a distance between the first object and a screen center of the video frame image where the first object is located;

a fourth score determined according to a proportion of a second object to an entire screen in the second historical video, where the fourth score of the second historical video is positively correlated with the proportion of the second object to the entire screen of the second historical video.

The first score can reflect a manual annotation made by a user for the second historical video, and can know an intuitive evaluation made by the user on the second historical video. The second score can reflect a clarity of the second historical video, and the higher the clarity of the second historical video, the higher the second score corresponding to the second historical video. The third score can reflect a deviation degree of a first object (which may be preset, such as a certain person, a certain building, etc.) in the second historical video screen relative to a center of the screen in the second historical video, and the closer the first object is to the center of the screen in the second historical video (that is, the smaller the deviation degree of the first object from the center of the screen in the second historical video), the higher the third score corresponding to the second historical video. The fourth score can reflect a proportion of a second object (which may be preset, for example, a certain person, a certain building, etc.) in the second historical video in the second historical video screen, and the larger the proportion of the second object in the second historical video, the higher the fourth score corresponding to the second historical video.

And, when using multiple of the first score, the second score, the third score and the fourth score to determine the historical quality score corresponding to the second historical video, a weight corresponding to each score can be set, and the historical quality score corresponding to the second historical video can be calculated by combining an actual score and the weight corresponding to the score.

From the above, the first quality evaluation model is obtained by training based on the second historical video and the historical quality score corresponding to the second historical video, that is to say, the first quality evaluation model can directly obtain an evaluation result for the video based on the input video. Therefore, the video frame images contained in the target video clip are input into the first quality evaluation model, and the obtained output result of the first quality evaluation model is the quality score corresponding to the target video clip. All the video frame images contained in the target video clip may be input into the first quality evaluation model, so as to ensure the accuracy of the output result of the first quality evaluation model. Alternatively, a part of the video frame images contained in the target video clip may be input into the first quality evaluation model, so as to reduce the data processing pressure of the first quality evaluation model.

In another possible implementation, the quality score corresponding to the target video clip is determined in the following manner:
  inputting the video frame images contained in the target video clips into a second quality evaluation model respectively to acquire initial quality scores output by the second quality evaluation model for each video frame image input into the second quality evaluation model;
  determining, according to the initial quality scores, the quality score corresponding to the target video clip.

The second quality evaluation model is obtained by training with third training data, for example, by training a machine learning algorithm with the third training data. The third training data can include a historical image and a historical quality score corresponding to the historical image. In a training process, a historical image is used as input data, and a historical quality score corresponding to the historical image is used as output data, and training is performed based on a machine learning algorithm to obtain a second quality evaluation model.

Exemplarily, the historical quality score corresponding to the historical image is determined by at least one of the following:
  a fifth score determined according to a user's mark score for the historical image;
  a sixth score determined according to a resolution rate of the historical image, where the sixth score of the historical image is positively correlated with the resolution rate of the historical image;
  a seventh score determined according to a position of a third object in a screen of the historical image, where the seventh score of the historical image is negatively correlated with a distance between the third object in the historical image and a screen center of the historical image;
  an eighth score determined according to a proportion of a fourth object to an entire screen in the historical image, where the eighth score of the historical image is positively correlated with the proportion of the fourth object in the historical image to the entire screen of the historical image.

The fifth score can reflect a manual annotation made by a user for the historical image, and can know an intuitive evaluation made by the user on the historical image. The sixth score can reflect a clarity of the historical image, and the higher the clarity of the historical image, the higher the second score corresponding to the historical image. The seventh score can reflect a deviation degree of a third object (which may be preset, such as a certain person, a certain building, etc.) in the historical image relative to a center of the screen in the historical image, and the closer the third object is to the center of the screen in the historical image (that is, the smaller the deviation degree of the third object from the center of the screen in the historical image), the higher the seventh score corresponding to the historical image. The eighth score can reflect a proportion of a fourth object (which may be preset, for example, a certain person, a certain building, etc.) in the historical image in the historical image screen, and the larger the proportion of the fourth object in the historical image, the higher the eighth score corresponding to the historical image.

And, when using multiple of the fifth score, the sixth score, the seventh score and the eighth score to determine the historical quality score corresponding to the historical image, a weight corresponding to each score can be set, and the historical quality score corresponding to the historical image can be calculated by combining an actual score and the weight corresponding to the score.

From the above, the second quality evaluation model is obtained by training based on the historical image and the historical quality score corresponding to the historical image, that is to say, the second quality evaluation model can obtain an evaluation result for the image based on the input single image. Therefore, the video frame images contained in the target video clip are respectively input into the second quality evaluation model, and the obtained output result of the second quality evaluation model is an initial quality score corresponding to the video frame image input into the second evaluation model in the target video clip, that is, the initial quality score corresponding to a single frame of video frame image. All the video frame images contained in the target video clip may be input into the second quality evaluation model, so as to ensure the accuracy of the output result of the second quality evaluation model. Alternatively, a part of the video frame images contained in the target video clip may be input into the second quality evaluation model, so as to reduce the data processing pressure of the second quality evaluation model.

After obtaining the initial quality score, the overall quality score of the target video clip is still unknown. Therefore, it is necessary to determine the quality score corresponding to the target video clip according to these initial quality scores.

Exemplarily, determining, according to the initial quality scores, the quality score corresponding to the target video clip may include any one of the following:
- determining an average value of the initial quality scores as the quality score corresponding to the target video clip;
- determining a maximum value of the initial quality scores as the quality score corresponding to the target video clip;
- determining a median of the initial quality scores as the quality score corresponding to the target video clip.

In step 13, displaying the quality score corresponding to the target video clip at a time position corresponding to the target video clip on a quality score display timeline.

The time position corresponding to the target video clip is a time position where the target video clip appears in the target video. The quality score display timeline is a timeline generated according to the target video, and each time point on which corresponds to a corresponding time point in the target video respectively.

In a possible implementation, step 13 may include any one of the following:
- displaying the quality score corresponding to the target video clip in a digital form at the time position corresponding to the target video clip on the quality score display timeline;
- displaying the quality score corresponding to the target video clip in a dot-shaped mark at the time position corresponding to the target video clip and at a score position corresponding to the quality score of the target video clip on the quality score display timeline;
- displaying the quality score corresponding to the target video clip in a bar mark at the time position corresponding to the target video clip on the quality score display timeline, where a maximum score of the bar mark corresponding to the target video clip is the quality score corresponding to the target video clip.

Exemplarily, if the target video clip is a video clip composed of 50 s~70 s in the target video, and the quality score corresponding to the target video clip is 0.6, the quality score can be displayed in the following examples.

Figure 2A:
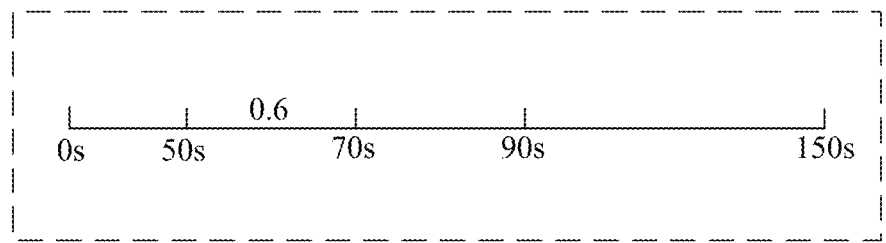
FIG. 2A-2C are several exemplary schematic diagrams showing quality scores in a video processing method according to the present disclosure.

FIG. 2A shows an exemplary display diagram of displaying a quality score corresponding to a target video clip in a digital form at a time position corresponding to a target video clip on a quality score display timeline.

Figure 2B:
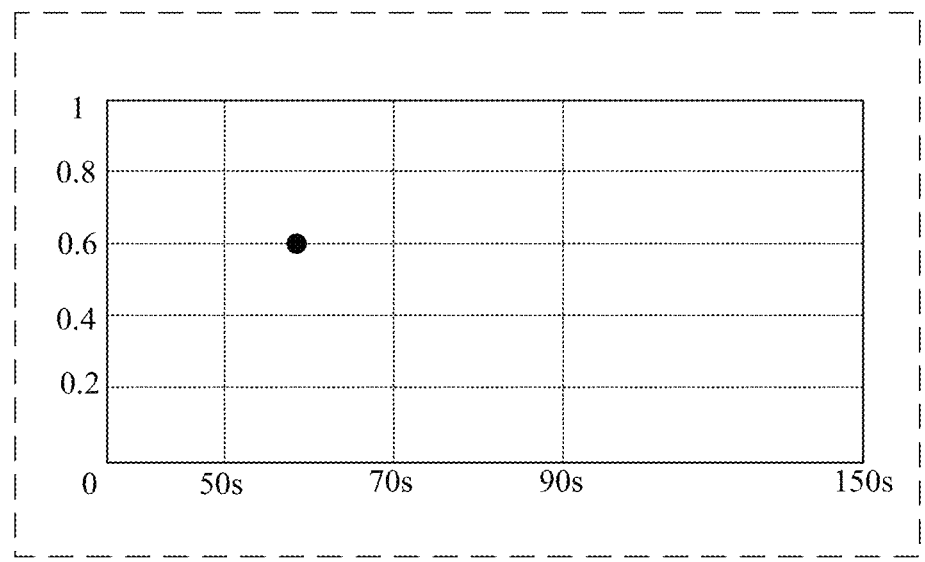

FIG. 2B shows an exemplary display diagram of displaying a quality score corresponding to a target video clip in a dot-shaped mark at a time position corresponding to the target video clip and at a score position corresponding to the quality score of the target video clip on a quality score display timeline.

Figure 2C:
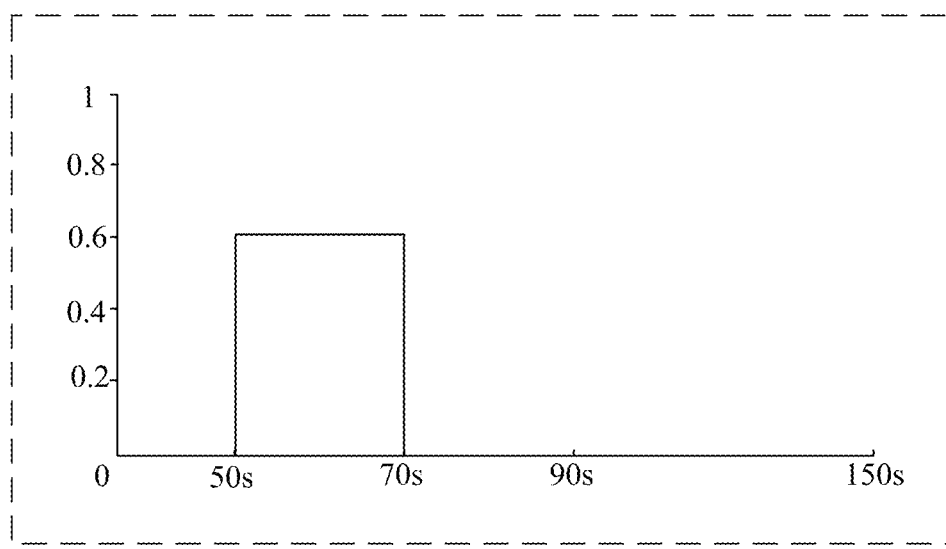

FIG. 2C shows an exemplary display diagram of displaying a quality score corresponding to a target video clip in a bar mark at a time position corresponding to a target video clip on a quality score display timeline.

As described above, the target video can be divided into a plurality of video clips including the target video clip. Therefore, when displaying quality scores, quality scores corresponding to each of the plurality of video clips can be displayed. The determination of the quality score corresponding to each video clip can refer to the process of determining the quality score corresponding to the target video clip, which will not be repeated herein. Thus, on the basis of the above implementation, the quality scores corresponding to the plurality of video clips in the target video can be obtained, and the quality scores corresponding to these video clips can be displayed to visually display the quality scores corresponding to each of the plurality of video clips in the target video.

Figure 3A:
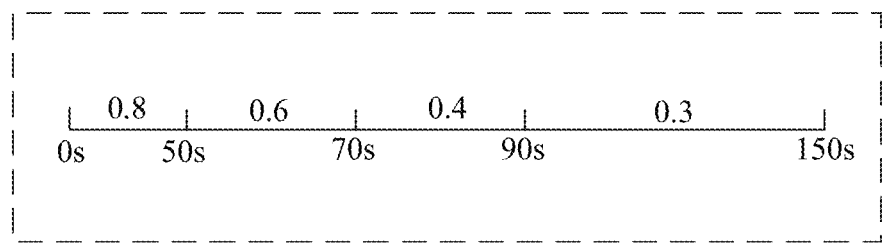
FIG. 3A-3C are several exemplary schematic diagrams showing quality scores in a video processing method according to the present disclosure.
Figure 3B:
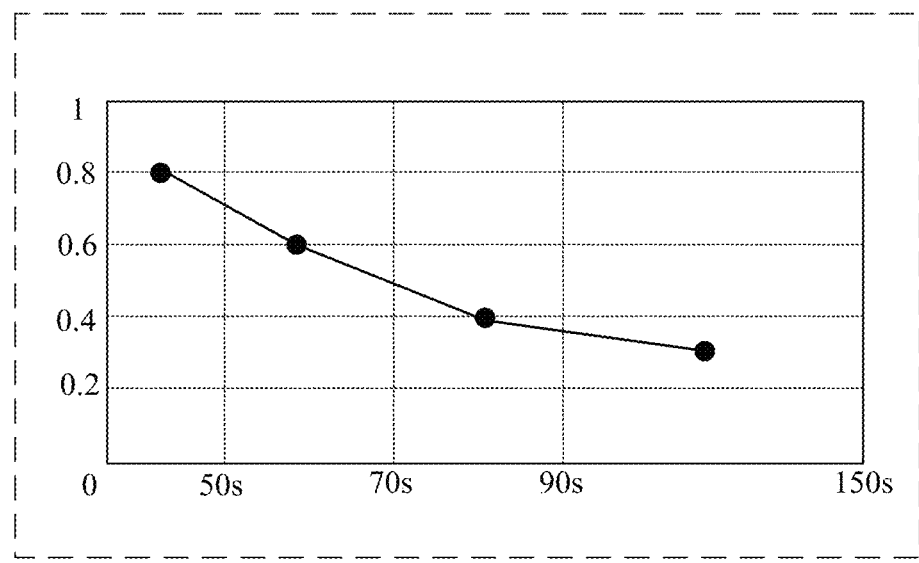
Figure 3C:
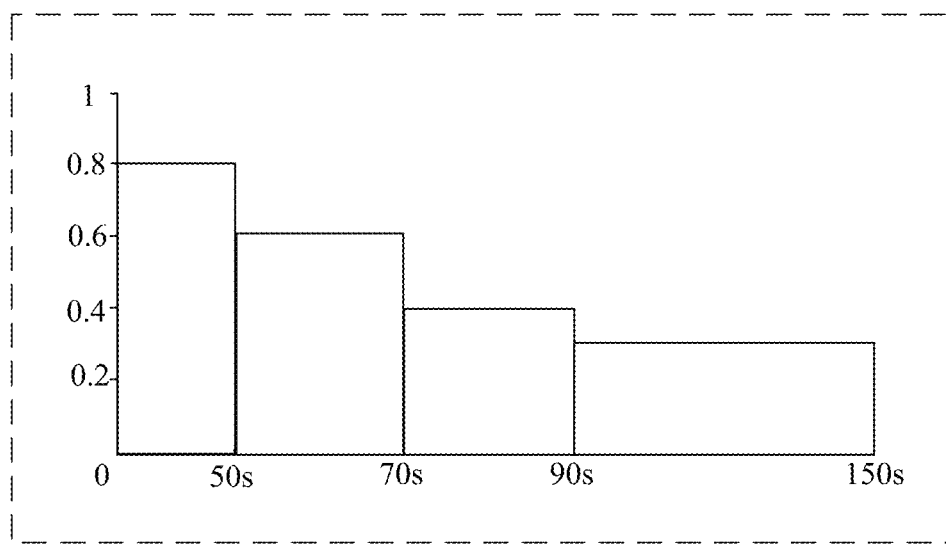

Exemplarily, if a quality score corresponding to a video clip composed of 0~50 s in the target video is 0.8, a quality score corresponding to a video clip composed of 50 s~70 s in the target video is 0.6, a quality score corresponding to a video clip composed of 70 s~90 s in the target video is 0.4, and a quality score corresponding to a video clip composed of 90 s~150 s in the target video is 0.3, then an exemplary display manners of the quality score can be as shown in FIGS. 3A, 3B and 3C (corresponding to the display manners of the above-mentioned FIGS. 2A, 2B and 2C in sequence). Moreover, in FIG. 3B, after displaying the quality scores corresponding to each video clip in the target video, the displayed dot-shaped marks can be connected in sequence to form a line, so as to more intuitively display changes of the quality scores.

Through the above technical solution, dividing a target video to obtain a target video clip, and determining a quality score corresponding to the target video clip according to video frame images contained in the target video clip, and displaying the quality score corresponding to the target video clip at a time position corresponding to the target video clip on a quality score display timeline. That is, after obtaining the quality score corresponding to the target video clip in the target video, the quality score corresponding to the target video clip can be displayed at a corresponding position of the quality score display timeline. Thus, it can provide a user with visual display results about the quality scores of the target video clip for the user to view, which is convenient for the user to quickly know the quality score corresponding to the target video clip, so as to provide a reference for the user's video clip selection, and save the time the user spends viewing the target video clip. In addition, based on the above solution, the quality scores corresponding to each of the plurality of video clips in the target video can be determined and displayed, so as to form an intuitive comparison of the quality scores of the plurality of video clips, provide a reference for the user to select video clips from the target video, and facilitate the user to quickly select video clips.

In a possible implementation, the quality score display timeline may be a video editing timeline corresponding to the target video, that is, the quality score of the target video clip in the target video is displayed on an editing interface of the target video. And, the target video clip corresponds to a start segmentation time point and an end segmentation time point in the target video, that is, start time and end time corresponding to the target video clip in the target video. In this implementation, in addition to the steps shown in FIG. 1, the present disclosure may further include the following steps:

displaying cutting marks corresponding to the target video clip at the start segmentation time point and the end segmentation time point corresponding to the target video clip on the video editing timeline corresponding to the target video.

The cutting mark is used to show the user start and end points of the target video clip in the target video, so that the user can know a specific position and corresponding screen and the like of the target video clip in the target video. Moreover, in practical applications, the cutting mark can provide users with a function of one-click clipping, that is, when the cutting mark is clicked, copying (or cut) the target video clip from the target video to form a video file corresponding to the target video clip.

In addition, as described above, the target video is divided to obtain a plurality of video clips including the target video, and each video clip can display cutting marks corresponding to the video clip in the above-mentioned manner. Therefore, when the cutting mark corresponding to a certain video clip is clicked, a file corresponding to the video clip which corresponds to the clicked cutting mark can be formed.

In the above manner, the corresponding position of the target video clip in the target video is displayed by the cutting mark, and the detailed content of the target video clip is displayed to the user, which is convenient for the user to save the video clip according to their own needs.

In a possible implementation, on the basis of the steps shown in FIG. 1, the method of the present disclosure may further include the following steps:

in response to receiving an editing instruction for the target video, if the quality score corresponding to the target video clip is higher than quality scores corresponding to other video clips in the target video, determining the target video clip as an alternative material for video splicing.

If the quality score corresponding to the target video clip is higher than the quality scores corresponding to other video clips in the target video, it means that the target video clip is the video clip with the highest quality score in the target video and has high availability. Therefore, the target video clip can be determined as an alternative material for video splicing, so as to provide usable materials for subsequent video splicing.

In a possible implementation, on the basis of the above steps, a plurality of alternative materials including the target video clip may further be synthesized into a target spliced video.

The other alternative materials other than the target video clip in the above-mentioned plurality of alternative materials may be other video clips in the target video except the target video clip, or may be taken from other videos except the target video, which is not limited by the present disclosure. Exemplarily, the quality scores corresponding to each video clip in the target video can be obtained with reference to the methods given above, and first few with higher quality scores are used as alternative materials to synthesize the target spliced video. For another example, referring to the method given above, the plurality of video including the target video can be processed, and the video clip with a highest quality score can be determined from each of the plurality of videos as alternative material to synthesize the target spliced video. In this way, a spliced video can be automatically generated for the user without manual operation by the user, thereby improving the video editing efficiency of the user.

In addition, in response to receiving the editing instruction for the target video, if the quality score corresponding to the target video clip is higher than the quality scores corresponding to other video clips in the target video, other content in the target video other than the target video clip can further be deleted directly, and only the target video clip can be retained. Exemplarily, if the target video clip is a single-frame video frame image, the above steps are equivalent to retaining only the video frame image with the highest quality score in the target video, that is, the "highlight moment" corresponding to the target video. For another example, if the target video clip is a plurality of frames of video frame images, the above steps are equivalent to retaining a highest score clip in the target video. In this way, the highest quality part of the video can be automatically reserved for the user, without the need for the user to view frame by frame, thereby improving the user's video editing efficiency.

Figure 4A:
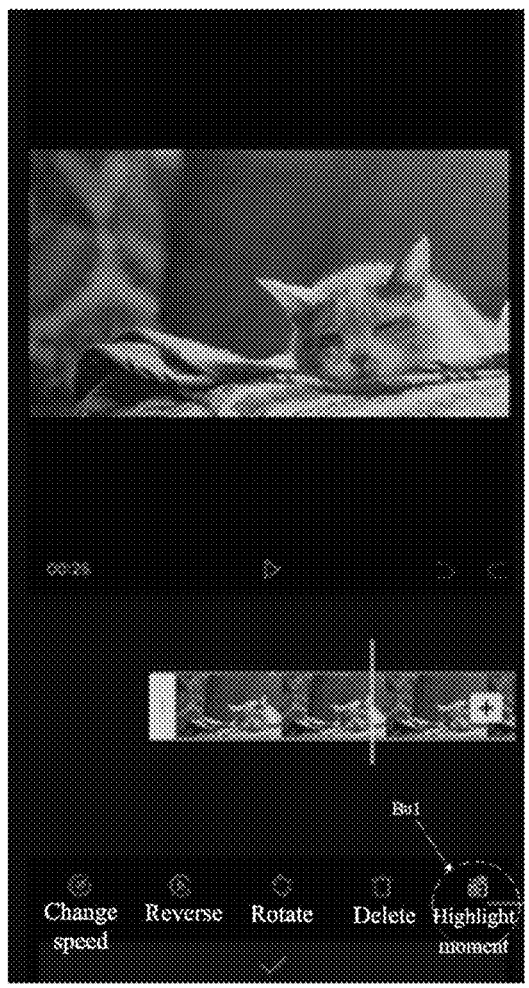
Figure 4B:
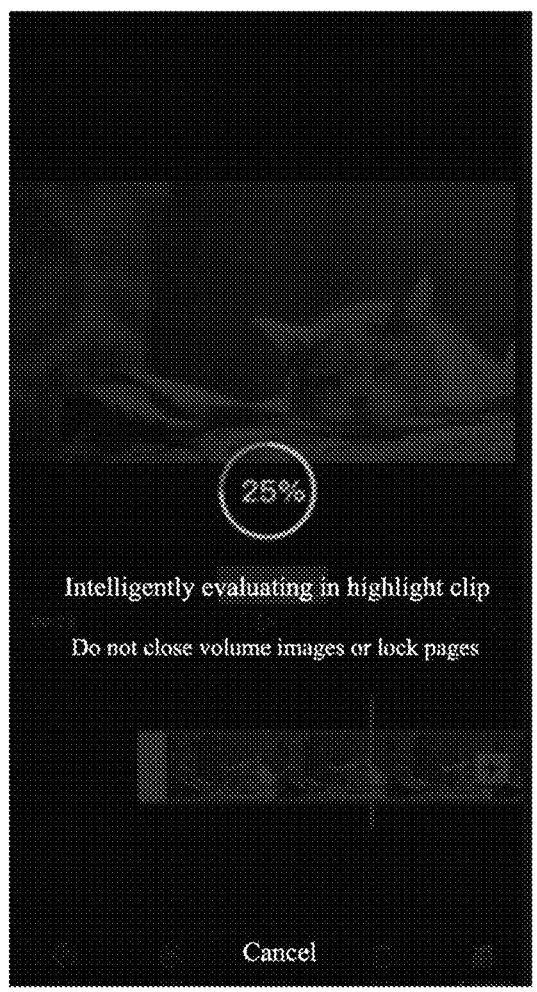
Figure 4E:
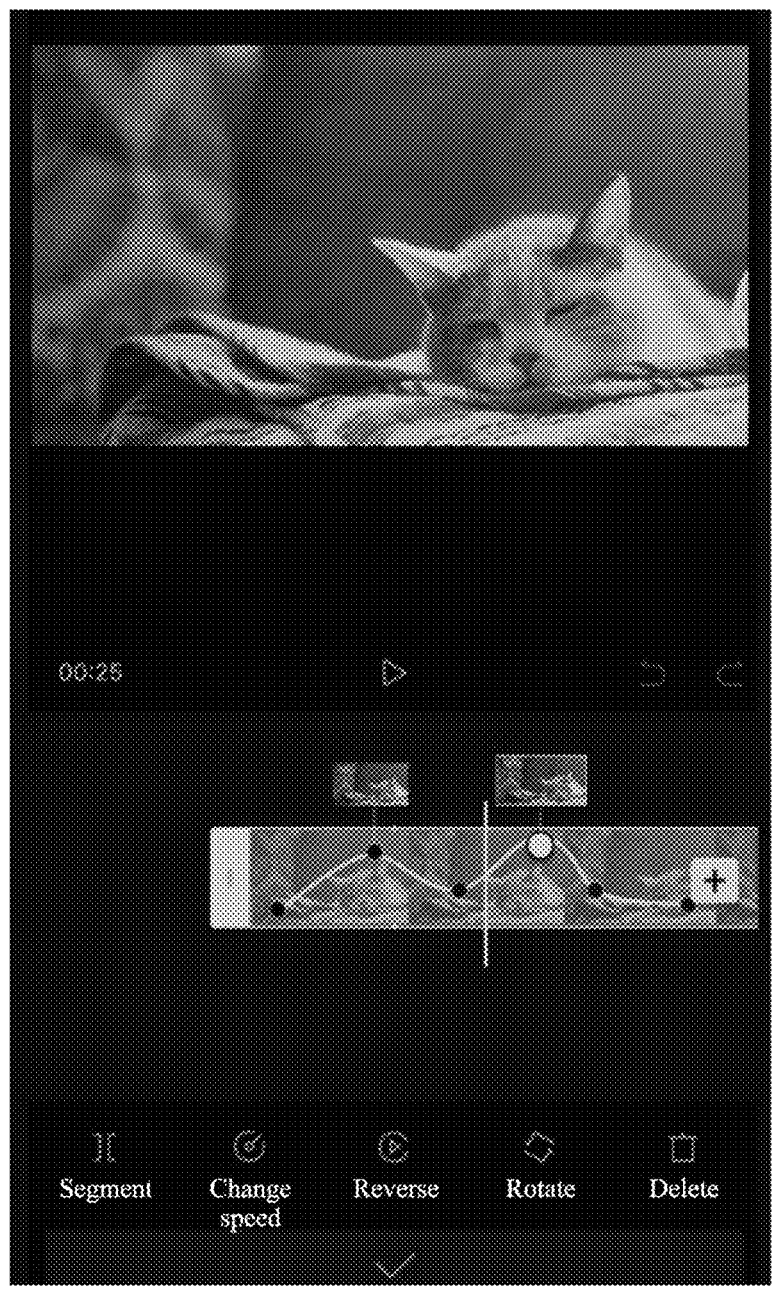

In an actual application scenario, an interactive page of a client can be displayed as shown in FIG. 4A to FIG. 4E. In FIG. 4A, a video editing page is displayed, in which a video editing timeline corresponding to a target video is displayed, and a button Bu1 in a lower right corner of a page is used to trigger "intelligent evaluation" function of the target video. For example, displaying a quality score of the target video clip, and retaining a video clip with high quality score in the target video, and the like. When a user clicks the button Bu1 in FIG. 4A, it means that the user has a demand for intelligent evaluation of the current video. At this time, the video displayed on the page is the target video, and then the relevant steps provided by the present disclosure can be performed to process the target video, for example, determining a quality score corresponding to the target video clip, or, if the quality score corresponding to the target video clip is higher than the quality score corresponding to other video clips in the target video, directly deleting other content in the target video except the target video clip, and only keeping the target video clip, etc. In the process of performing the above steps, the client display content can be as shown in FIG. 4B, where the percentage in the center of FIG. 4B is used to indicate the progress of data processing. When the percentage reaches 100%, the current data processing is completed, that is, the intelligent evaluation of the target video by the middle platform has been completed, and the client display content can be shown in FIG. 4C. Afterwards, a specific intelligent evaluation result can be displayed, as shown in FIG. 4D or FIG. 4E. In FIG. 4D and FIG. 4E, a curve represents a quality score curve composed of the quality scores of each video clip in the target video. And, in FIG. 4D, in addition to the quality score curve, the video clip retained after the target video clip is further displayed below the quality score curve. In FIG. 4E, in addition to the quality score curve, corresponding video frame images are displayed at several higher quality score positions in the quality score curve, that is, the "highlight moment" corresponding to the target video.

Figure 5:
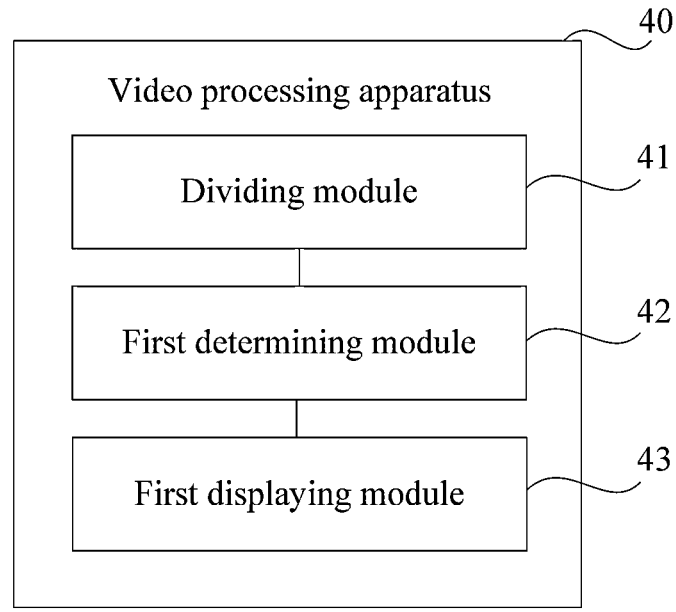
FIG. 5 is a block diagram of a video processing apparatus according to an implementation of the present disclosure.

FIG. 5 is a block diagram of a video processing apparatus according to an Implementation of the present disclosure. As shown in FIG. 5, the apparatus 40 may include:

a dividing module 41, configured to divide a target video to obtain a target video clip;

a first determining module 42, configured to determine, according to video frame images contained in the target video clip, a quality score corresponding to the target video clip;

a first displaying module 43, configured to display the quality score corresponding to the target video clip at a time position corresponding to the target video clip on a quality score display timeline, where the time position corresponding to the target video clip is a time position where the target video clip appears in the target video.

Optionally, the dividing module 41 includes:

a slicing sub-module, configured to input a plurality of frames of target video frame images at different time positions in the target video and times when the plurality of frames of target video frame images appear in the target video into a slicing algorithm to acquire a target segmentation time point output by the slicing algorithm, where the slicing algorithm is obtained by training a machine learning algorithm with first training data, and the first training data includes a first historical video and a historical segmentation time point for dividing the first historical video;

a dividing sub-module, configured to divide, according to the target segmentation time point, the target video to obtain a plurality of video clips including the target video clip.

Optionally, the first determining module 42 is configured to determine the quality score corresponding to the target video clip in the following manner:

inputting the video frame images contained in the target video clips into a first quality evaluation model to acquire the quality score corresponding to the target video clip, where the first quality evaluation model is obtained by training with second training data, and the second training data includes a second historical video and a historical quality score corresponding to the second historical video.

Optionally, the historical quality score corresponding to the second historical video is determined by at least one of the following:

a first score determined according to a user's mark score for the second historical video;

a second score determined according to a resolution rate of the second historical video, where the second score of the second historical video is positively correlated with the resolution rate of the second historical video;

a third score determined according to a position of a first object in a screen of the second historical video, where the third score of the second historical video is negatively correlated with a distance between the first object and a screen center of the video frame image where the first object is located;

a fourth score determined according to a proportion of a second object to an entire screen in the second historical video, where the fourth score of the second historical video is positively correlated with the proportion of the second object to the entire screen of the second historical video.

Optionally, the first determining module 42 includes:

a processing sub-module, configured to input the video frame images contained in the target video clips into a second quality evaluation model respectively to acquire initial quality scores output by the second quality evaluation model for each video frame image input into the second quality evaluation model, where the second quality evaluation model is obtained by training with third training data, and the third training data includes a historical image and a historical quality score corresponding to the historical image;

a determining sub-module, configured to determine, according to the initial quality scores, the quality score corresponding to the target video clip.

Optionally, the determining sub-module is configured to determine the quality score corresponding to the target video clip by any one of the following:

determining an average value of the initial quality scores as the quality score corresponding to the target video clip;

determining a maximum value of the initial quality scores as the quality score corresponding to the target video clip;

determining a median of the initial quality scores as the quality score corresponding to the target video clip.

Optionally, the historical quality score corresponding to the historical image is determined by at least one of the following:

a fifth score determined according to a user's mark score for the historical image;

a sixth score determined according to a resolution rate of the historical image, where the sixth score of the historical image is positively correlated with the resolution rate of the historical image;

a seventh score determined according to a position of a third object in a screen of the historical image, where the seventh score of the historical image is negatively correlated with a distance between the third object in the historical image and a screen center of the historical image;

an eighth score determined according to a proportion of a fourth object to an entire screen in the historical image, where the eighth score of the historical image is positively correlated with the proportion of the fourth object in the historical image to the entire screen of the historical image.

Optionally, the target video is divided into a plurality of video clips including the target video clip;

the apparatus 40 further includes:

a second determining module, configured to in response to receiving an editing instruction for the target video, if the quality score corresponding to the target video clip is higher than quality scores corresponding to other video clips in the target video, determine the target video clip as an alternative material for video splicing.

Optionally, the apparatus 40 further includes:

a synthesizing module, configured to synthesize a plurality of alternative materials including the target video clip into a target spliced video.

Optionally, the first displaying module 43 includes any one of the following:

a first displaying sub-module, configured to display the quality score corresponding to the target video clip in a digital form at the time position corresponding to the target video clip on the quality score display timeline;

a second displaying sub-module, configured to display the quality score corresponding to the target video clip in a dot-shaped mark at the time position corresponding to the target video clip and at a score position corresponding to the quality score of the target video clip on the quality score display timeline;

a third displaying sub-module, configured to display the quality score corresponding to the target video clip in a bar mark at the time position corresponding to the target video clip on the quality score display timeline, where a maximum score of the bar mark corresponding to the target video clip is the quality score corresponding to the target video clip.

Optionally, the quality score display timeline is a video editing timeline corresponding to the target video.

Optionally, the target video clip corresponds to a start segmentation time point and an end segmentation time point in the target video;

the apparatus 40 further includes:

a second displaying module, configured to display cutting marks corresponding to the target video clip at the start segmentation time point and the end segmentation time point corresponding to the target video clip on the video editing timeline corresponding to the target video.

Regarding the apparatus in the above-mentioned embodiment, the specific manner in which each module performs operations has been described in detail in the embodiment of the method, and will not be described in detail herein.

Figure 6:
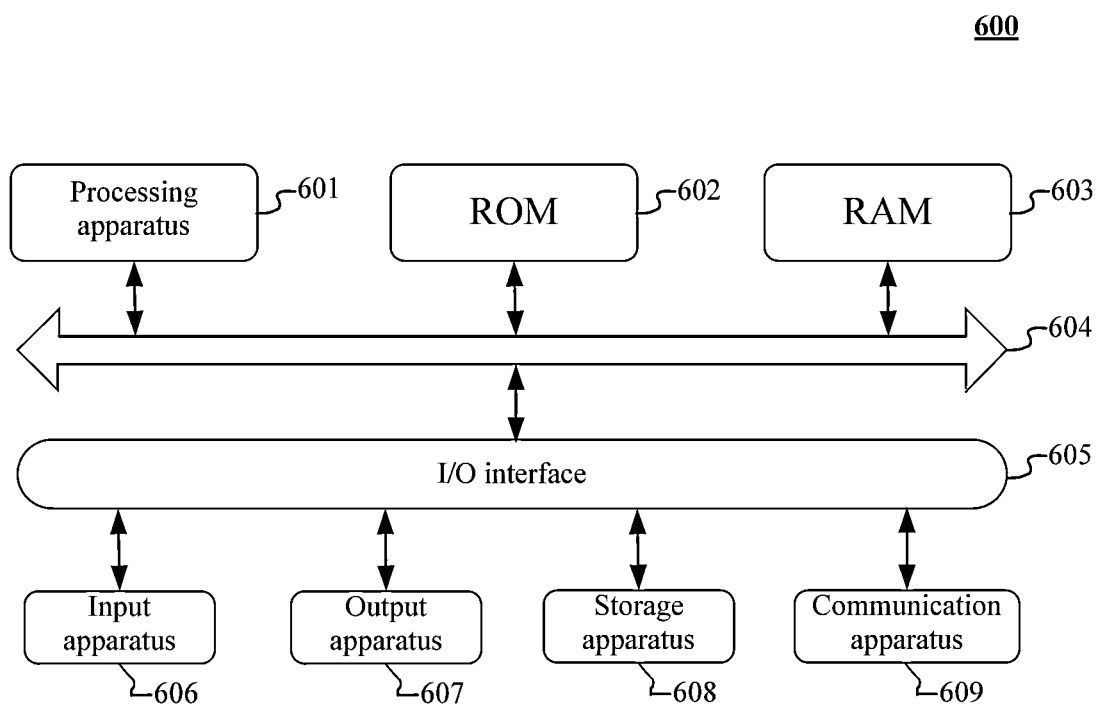
FIG. 6 is a block diagram of a device according to an exemplary embodiment.

The following refers to FIG. 6, a structural diagram of an electronic device 600 suitable for implementing an embodiment of the present disclosure is shown. The terminal device in the embodiments of the present disclosure may include, but is not limited to, a mobile terminal, such as a mobile phone, a notebook computer, a digital broadcast receiver, a PDA (Personal Digital Assistant), a PAD (Portable Android Device), a PMP (Portable Media Player), a vehicle terminal (for example, a vehicle navigation terminal), etc., and a fixed terminal, such as a digital television (TV), a desktop computer, etc. The electronic device shown in FIG. 6 is only an example, and should not bring any limitation to the function and scope of use of the embodiments of the present disclosure.

As shown in FIG. 6, the electronic device 600 may include a processing apparatus (for example, a central processor, a graphic processor, etc.) 601, which may perform various appropriate actions and processing according to a program stored in a read-only memory (ROM) 602 or a program loaded from a storage apparatus 608 to a random access memory (RAM) 603. In the RAM 603, various programs and data required for operations of the electronic device 600 may also be stored. The processing apparatus 601, the ROM 602, and the RAM 603 are connected to each other by a bus 604. An input/output (I/O) interface 605 is also connected to the bus 604.

Generally, the following apparatuses may connect to the I/O interface 605: an input apparatus 606, which includes, for example, a touch screen, a touch pad, a keyboard, a mouse, a camera, a microphone, an accelerometer, a gyroscope, etc.; an output apparatus 607, which includes, for example, a liquid crystal display (LCD), a speaker, a vibrator, etc.; a storage apparatus 608, which includes, for example, a magnetic tape, a hard disk, etc.; and a communication apparatus 609. The communication apparatus 609 may allow the electronic device 600 to communicate with other devices in a wireless or wired way, to exchange data. Although FIG. 6 shows an electronic device 600 having various apparatuses, it should be understood that it is not required to implement or have all of the shown apparatuses. It is alternatively possible to implement or have more or fewer apparatuses.

In particular, according to an embodiment of the present disclosure, processes described above with reference to flowchart may be implemented as a computer software program. For example, an embodiment of the present disclosure includes a computer program product, which includes a computer program carried on a non-transitory computer readable medium, and the computer program contains program codes used for executing the method shown in the flowchart. In such embodiment, the computer program may be downloaded and installed from a network via the communication apparatus 609, or installed from the storage apparatus 608, or installed from the ROM 602. When the computer program is executed by the processing apparatus 601, the above functions defined in the method of the embodiments of the present disclosure are performed.

It should be noted that the above computer readable medium in the present disclosure may be a computer readable signal medium, or a computer readable storage medium, or any combination of both. The computer readable storage medium may be, for example, but is not limited to, an electrical, magnetic, optical, electromagnetic, infrared, or semiconductor system, apparatus, or component, or any combination thereof. More specific examples of the computer readable storage medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage component, a magnetic storage component, or any suitable combination thereof. In the present disclosure, a computer readable storage medium may be any tangible medium that contains or stores a program, and the program may be used by or in combination with an instruction execution system, apparatus, or component. However, in the present disclosure, a computer readable signal medium may include a data signal propagated in a baseband or as a part of a carrier, and the data signal carries computer readable program codes. Such propagated data signal may take various forms, including but not limited to an electromagnetic signal, an optical signal, or any suitable combination thereof. The computer readable signal medium may also be any computer readable medium other than the computer readable storage medium, and the computer readable signal medium may send, propagate, or transmit a program which is used by or in combination with the instruction execution system, apparatus, or component. The program codes contained in the computer readable medium may be transmitted by any suitable medium, including but not limited to: a wire, an optical cable, an RF (Radio Frequency), etc., or any suitable combination thereof.

In some embodiments, a terminal and a server may use any currently known or future developed network protocol such as HTTP (hyperText transfer protocol) to communicate, and may be interconnected with any form or medium of digital data communication (e.g., a communications network). Examples of communication networks include Local Area Network (LAN), Wide Area Network (WAN), Internet, and end-to-end network (e.g., ADaptive Heuristic for Opponent Classification (ad hoc) end-to-end network), and any currently known or future developed network.

The above-mentioned computer readable medium may be included in the above-mentioned terminal device; or it may exist alone without being assembled into the electronic device.

The above-mentioned computer readable medium carries one or more programs, and when the above-mentioned one or more programs are executed by the electronic device, the electronic device is caused to: divide a target video to obtain a target video clip, determine, according to video frame images contained in the target video clip, a quality score corresponding to the target video clip; and display the quality score corresponding to the target video clip at a time position corresponding to the target video clip on a quality score display timeline, where the time position corresponding to the target video clip is a time position where the target video clip appears in the target video.

The computer program codes used to perform operations of the present disclosure may be written in one or more programming languages or a combination thereof, the above programming languages include, but is not limited to, object-oriented programming languages, such as Java, Smalltalk, C++, and also include conventional procedural programming languages, such as "C" language or similar programming language. The program codes may be executed entirely on a user's computer, executed partly on a user's computer, executed as an independent software package, executed partly on a user's computer and partly on a remote computer, or executed entirely on a remote computer or a server. In the case of a remote computer involved, the remote computer may connect to the user's computer through any kind of networks, including a local area network (LAN) or a wide area network (WAN), or, it may be connected to an external computer (for example, connected via the Internet through an Internet service provider).

The flowcharts and block diagrams in the accompanying drawings illustrate possible implementation architecture, functions, and operations of the system, method, and computer program product according to various embodiments of the present disclosure. In this point, each block in the flowchart or block diagram may represent a module, a program segment, or a part of code, and the module, the program segment, or the part of code contains one or more executable instructions for implementing a designated logical function. It should also be noted that, in some alternative implementations, functions marked in the block may also occur in an order different from the order marked in the accompanying drawings. For example, two blocks shown one after another may actually be executed substantially in parallel, or sometimes may be executed in a reverse order, which depends on the functions involved. It should also be noted that, each block in the block diagram and/or flowchart, and a combination of the blocks in the block diagram and/or flowchart, may be implemented by a dedicated hardware-based system that performs designated functions or operations, or may be implemented by a combination of dedicated hardware and computer instructions.

Modules involved in the embodiments described in the present disclosure may be implemented in a software or hardware manner. A name of a module does not constitute a limitation on the module itself under certain circumstances, for example, a dividing module may also be described as "a module for dividing a target video to obtain a target video clip".

The functions described herein above may be performed at least in part by one or more hardware logic components. For example, non-restrictively, exemplary types of hardware logic components that may be used include: a field programmable gate array (FPGA), an application specific integrated circuit (ASIC), an application specific standard parts (ASSP), a system on chip (SOC), a complex programmable logic device (CCPLD), etc.

In the context of the present disclosure, a machine readable medium may be a tangible medium that may contain or store a program to be used by or in combination with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination thereof. More specific examples of the machine readable storage medium would include an electrical connection based on one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof.

According to one or more embodiments of the present disclosure, a video processing method is provided, including:

dividing a target video to obtain a target video clip;

determining, according to video frame images contained in the target video clip, a quality score corresponding to the target video clip;

displaying the quality score corresponding to the target video clip at a time position corresponding to the target video clip on a quality score display timeline, where the time position corresponding to the target video clip is a time position where the target video clip appears in the target video.

According to one or more embodiments of the present disclosure, a video processing method is further provided, where the dividing the target video to obtain the target video clip includes:

inputting a plurality of frames of target video frame images at different time positions in the target video and times when the plurality of frames of target video frame images appear in the target video into a slicing algorithm to acquire a target segmentation time point output by the slicing algorithm, where the slicing algorithm is obtained by training a machine learning algorithm with first training data, and the first training data includes a first historical video and a historical segmentation time point for dividing the first historical video;

dividing, according to the target segmentation time point, the target video to obtain a plurality of video clips including the target video clip.

According to one or more embodiments of the present disclosure, a video processing method is further provided, where the quality score corresponding to the target video clip is determined in the following manner:

inputting the video frame images contained in the target video clips into a first quality evaluation model to acquire the quality score corresponding to the target video clip, where the first quality evaluation model is obtained by training with second training data, and the second training data includes a second historical video and a historical quality score corresponding to the second historical video.

According to one or more embodiments of the present disclosure, a video processing method is further provided, where the historical quality score corresponding to the second historical video is determined by at least one of the following:

a first score determined according to a user's mark score for the second historical video;

a second score determined according to a resolution rate of the second historical video, where the second score of the second historical video is positively correlated with the resolution rate of the second historical video;

a third score determined according to a position of a first object in a screen of the second historical video, where the third score of the second historical video is negatively correlated with a distance between the first object and a screen center of the video frame image where the first object is located;

a fourth score determined according to a proportion of a second object to an entire screen in the second historical video, where the fourth score of the second historical video is positively correlated with the proportion of the second object to the entire screen of the second historical video.

According to one or more embodiments of the present disclosure, a video processing method is further provided, where the quality score corresponding to the target video clip is determined in the following manner:

inputting the video frame images contained in the target video clips into a second quality evaluation model respectively to acquire initial quality scores output by the second quality evaluation model for each video frame image input into the second quality evaluation model, where the second quality evaluation model is obtained by training with third training data, and the third training data includes a historical image and a historical quality score corresponding to the historical image;

determining, according to the initial quality scores, the quality score corresponding to the target video clip.

According to one or more embodiments of the present disclosure, a video processing method is further provided, where the determining, according to the initial quality scores, the quality score corresponding to the target video clip includes any one of the following:

determining an average value of the initial quality scores as the quality score corresponding to the target video clip;

determining a maximum value of the initial quality scores as the quality score corresponding to the target video clip;

determining a median of the initial quality scores as the quality score corresponding to the target video clip.

According to one or more embodiments of the present disclosure, a video processing method is further provided, where the historical quality score corresponding to the historical image is determined by at least one of the following:

a fifth score determined according to a user's mark score for the historical image;

a sixth score determined according to a resolution rate of the historical image, where the sixth score of the historical image is positively correlated with the resolution rate of the historical image;

a seventh score determined according to a position of a third object in a screen of the historical image, where the seventh score of the historical image is negatively correlated with a distance between the third object in the historical image and a screen center of the historical image;

an eighth score determined according to a proportion of a fourth object to an entire screen in the historical image, where the eighth score of the historical image is positively correlated with the proportion of the fourth object in the historical image to the entire screen of the historical image.

According to one or more embodiments of the present disclosure, a video processing method is further provided, where the target video is divided into a plurality of video clips including the target video clip;

the method further includes:

in response to receiving an editing instruction for the target video, if the quality score corresponding to the target video clip is higher than quality scores corresponding to other video clips in the target video, determining the target video clip as an alternative material for video splicing According to one or more embodiments of the present disclosure, a video processing method is further provided, where the method further includes:

synthesizing a plurality of alternative materials including the target video clip into a target spliced video.

According to one or more embodiments of the present disclosure, a video processing method is further provided, where the displaying the quality score corresponding to the target video clip at the time position corresponding to the target video clip on the quality score display timeline includes any one of the following:

displaying the quality score corresponding to the target video clip in a digital form at the time position corresponding to the target video clip on the quality score display timeline;

displaying the quality score corresponding to the target video clip in a dot-shaped mark at the time position corresponding to the target video clip and at a score position corresponding to the quality score of the target video clip on the quality score display timeline;

displaying the quality score corresponding to the target video clip in a bar mark at the time position corresponding to the target video clip on the quality score display timeline, where a maximum score of the bar mark corresponding to the target video clip is the quality score corresponding to the target video clip.

According to one or more embodiments of the present disclosure, a video processing method is further provided, where the quality score display timeline is a video editing timeline corresponding to the target video.

According to one or more embodiments of the present disclosure, a video processing method is further provided, where the target video clip corresponds to a start segmentation time point and an end segmentation time point in the target video;

the method further includes:

displaying cutting marks corresponding to the target video clip at the start segmentation time point and the end segmentation time point corresponding to the target video clip on the video editing timeline corresponding to the target video.

According to one or more embodiments of the present disclosure, a video processing apparatus is provided, including:

a dividing module, configured to divide a target video to obtain a target video clip;

a first determining module, configured to determine, according to video frame images contained in the target video clip, a quality score corresponding to the target video clip;

a first displaying module, configured to display the quality score corresponding to the target video clip at a time position corresponding to the target video clip on a quality score display timeline, where the time position corresponding to the target video clip is a time position where the target video clip appears in the target video.

According to one or more embodiments of the present disclosure, a video processing apparatus is further provided, where the dividing module includes:

a slicing sub-module, configured to input a plurality of frames of target video frame images at different time positions in the target video and times when the plurality of frames of target video frame images appear in the target video into a slicing algorithm to acquire a target segmentation time point output by the slicing algorithm, where the slicing algorithm is obtained by training a machine learning algorithm with first training data, and the first training data includes a first historical video and a historical segmentation time point for dividing the first historical video;

a dividing sub-module, configured to divide, according to the target segmentation time point, the target video to obtain a plurality of video clips including the target video clip.

According to one or more embodiments of the present disclosure, a video processing apparatus is further provided, where the first determining module is configured to determine the quality score corresponding to the target video clip in the following manner:
inputting the video frame images contained in the target video clips into a first quality evaluation model to acquire the quality score corresponding to the target video clip, where the first quality evaluation model is obtained by training with second training data, and the second training data includes a second historical video and a historical quality score corresponding to the second historical video.

According to one or more embodiments of the present disclosure, a video processing apparatus is further provided, where the historical quality score corresponding to the second historical video is determined by at least one of the following:
a first score determined according to a user's mark score for the second historical video;
a second score determined according to a resolution rate of the second historical video, where the second score of the second historical video is positively correlated with the resolution rate of the second historical video;
a third score determined according to a position of a first object in a screen of the second historical video, where the third score of the second historical video is negatively correlated with a distance between the first object and a screen center of the video frame image where the first object is located;
a fourth score determined according to a proportion of a second object to an entire screen in the second historical video, where the fourth score of the second historical video is positively correlated with the proportion of the second object to the entire screen of the second historical video.

According to one or more embodiments of the present disclosure, a video processing apparatus is further provided, where the first determining module includes:
a processing sub-module, configured to input the video frame images contained in the target video clips into a second quality evaluation model respectively to acquire initial quality scores output by the second quality evaluation model for each video frame image input into the second quality evaluation model, where the second quality evaluation model is obtained by training with third training data, and the third training data includes a historical image and a historical quality score corresponding to the historical image;
a determining sub-module, configured to determine, according to the initial quality scores, the quality score corresponding to the target video clip.

According to one or more embodiments of the present disclosure, a video processing apparatus is further provided, where the determining sub-module is configured to determine the quality score corresponding to the target video clip by any one of the following:
determining an average value of the initial quality scores as the quality score corresponding to the target video clip;
determining a maximum value of the initial quality scores as the quality score corresponding to the target video clip;
determining a median of the initial quality scores as the quality score corresponding to the target video clip.

According to one or more embodiments of the present disclosure, a video processing apparatus is further provided, where the historical quality score corresponding to the historical image is determined by at least one of the following:
a fifth score determined according to a user's mark score for the historical image;
a sixth score determined according to a resolution rate of the historical image, where the sixth score of the historical image is positively correlated with the resolution rate of the historical image;
a seventh score determined according to a position of a third object in a screen of the historical image, where the seventh score of the historical image is negatively correlated with a distance between the third object in the historical image and a screen center of the historical image;
an eighth score determined according to a proportion of a fourth object to an entire screen in the historical image, where the eighth score of the historical image is positively correlated with the proportion of the fourth object in the historical image to the entire screen of the historical image.

According to one or more embodiments of the present disclosure, a video processing apparatus is further provided, where the target video is divided into a plurality of video clips including the target video clip;
the apparatus further includes:
a second determining module, configured to in response to receiving an editing instruction for the target video, if the quality score corresponding to the target video clip is higher than quality scores corresponding to other video clips in the target video, determine the target video clip as an alternative material for video splicing.

According to one or more embodiments of the present disclosure, a video processing apparatus is further provided, where the apparatus further includes:
a synthesizing module, configured to synthesize a plurality of alternative materials including the target video clip into a target spliced video.

According to one or more embodiments of the present disclosure, a video processing apparatus is further provided, where the first displaying module includes any one of the following:
a first displaying sub-module, configured to display the quality score corresponding to the target video clip in a digital form at the time position corresponding to the target video clip on the quality score display timeline;
a second displaying sub-module, configured to display the quality score corresponding to the target video clip in a dot-shaped mark at the time position corresponding to the target video clip and at a score position corresponding to the quality score of the target video clip on the quality score display timeline;
a third displaying sub-module, configured to display the quality score corresponding to the target video clip in a bar mark at the time position corresponding to the target video clip on the quality score display timeline, where a maximum score of the bar mark corresponding to the target video clip is the quality score corresponding to the target video clip.

According to one or more embodiments of the present disclosure, a video processing apparatus is further provided, where the quality score display timeline is a video editing timeline corresponding to the target video.

According to one or more embodiments of the present disclosure, a video processing apparatus is further provided, where the target video clip corresponds to a start segmentation time point and an end segmentation time point in the target video;

the apparatus further includes:
a second displaying module, configured to display cutting marks corresponding to the target video clip at the start segmentation time point and the end segmentation time point corresponding to the target video clip on the video editing timeline corresponding to the target video.

According to one or more embodiments of the present disclosure, a computer program product is provided, the program product includes: a computer program, and when the computer program is executed by a processing apparatus, the steps of the method described in any of the embodiments of the present disclosure is implemented.

According to one or more embodiments of the present disclosure, a computer program is provided, and when the computer program is executed by a processing apparatus, the steps of the method described in any of the embodiments of the present disclosure is implemented.

The above description is merely illustration of preferred embodiments of the present disclosure and applied technical principles. Those skilled in the art should understand that the disclosed scope involved in the present disclosure is not limited to technical solutions formed by a specific combination of the above technical features, and should also cover other technical solutions formed by any combination of the above technical features or equivalent features thereof without departing from the above disclosed concept, for example, a technical solution formed by replacing the above-mentioned features with the technical features disclosed in the present disclosure (but not limited to) having similar functions.

In addition, although operations are depicted in a specific order, this should not be understood as requiring these operations to be performed in the specific order as shown or in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments may also be implemented in combination in a single embodiment. Conversely, various features described in the context of a single embodiment may also be implemented in multiple embodiments individually or in any suitable subcombination.

Although the present subject matter has been described in language specific to structural features and/or method logical actions, it should be understood that the subject matter defined in the appended claims is not necessarily limited to the specific features or actions described above. Conversely, the specific features and actions described above are merely example forms for implementing the claims. Regarding the apparatus in the above-mentioned embodiment, the specific manner in which each module performs operations has been described in detail in the embodiment of the method, and will not be described in detail herein.

What is claimed is:

1. A video processing method, comprising:
dividing a target video to obtain a target video clip;
determining, according to video frame images contained in the target video clip, a quality score corresponding to the target video clip;
displaying the quality score corresponding to the target video clip at a time position corresponding to the target video clip on a quality score display timeline, Wherein the time position corresponding to the target video clip is a time position Where the target video clip appears in the target video;
wherein the target video is divided into a plurality of video clips comprising the target video clip;
the method further comprises:
in response to receiving an editing instruction for the target video, if the quality score corresponding to the target video clip is higher than quality scores corresponding to other video clips in the target video, determining the target video clip as art alternative material for video splicing; and
synthesizing a plurality of alternative materials comprising the target video clip into a target spliced video.

2. The method according to claim 1, wherein the dividing the target video to obtain the target video clip comprises:
inputting a plurality of frames of target video frame images at different time positions in the target video and times when the plurality of frames of target video frame images appear in the target video into a slicing algorithm to acquire a target segmentation time point output by the slicing algorithm, wherein the slicing algorithm is obtained by training a machine learning algorithm with first training data, and the first training data comprises a first historical video and a historical segmentation time point for dividing the first historical video;
dividing, according to the target segmentation time point, the target video to obtain a plurality of video clips comprising the target video clip.

3. The method according to claim 1, wherein the displaying the quality score corresponding to the target video clip at the time position corresponding to the target video clip on the quality score display timeline comprises any one of the following:
displaying the quality score corresponding to the target video clip in a digital form at the time position corresponding to the target video clip on the quality score display timeline;
displaying the quality score corresponding to the target video clip in a dot-shaped mark at the time position corresponding to the target video clip and at a score position corresponding to the quality score of the target video clip on the quality score display timeline;
displaying the quality score corresponding to the target video clip in a bar mark at the time position corresponding to the target video clip on the quality score display timeline, wherein a maximum score of the bar mark corresponding to the target video clip is the quality score corresponding to the target video clip.

4. The method according to claim 3, wherein the quality score display timeline is a video editing timeline corresponding to the target video.

5. The method according to claim 1, wherein the target video clip corresponds to a start segmentation time point and an end segmentation time point in the target video;
the method further comprises:
displaying cutting marks corresponding to the target video clip at the start segmentation time point and the end segmentation time point corresponding to the target video clip on the video editing timeline corresponding to the target video.

6. The method according to claim 1, wherein the quality score corresponding to the target video clip is determined in the following manner:
inputting the video frame images contained in the target video clips into a first quality evaluation model to acquire the quality score corresponding to the target video clip, wherein the first quality evaluation model is obtained by training with second training data, and the second training data comprises a second historical video and a historical quality score corresponding to the second historical video.

7. The method according to claim 6, wherein the historical quality score corresponding to the second historical video is determined by at least one of the following:
   a first score determined according to a user's mark score for the second historical video;
   a second score determined according to a resolution rate of the second historical video, wherein the second score of the second historical video is positively correlated with the resolution rate of the second historical video;
   a third score determined according to a position of a first object in a screen of the second historical video, wherein the third score of the second historical video is negatively correlated with a distance between the first object and a screen center of the video frame image where the first object is located;
   a fourth score determined according to a proportion of a second object to an entire screen in the second historical video, wherein the fourth score of the second historical video is positively correlated with the proportion of the second object to the entire screen of the second historical video.

8. The method according to claim 1, wherein the quality score corresponding to the target video clip is determined in the following manner:
   inputting the video frame images contained in the target video clips into a second quality evaluation model respectively to acquire initial quality scores output by the second quality evaluation model for each video frame image input into the second quality evaluation model, wherein the second quality evaluation model is obtained by training with third training data, and the third training data comprises a historical image and a historical quality score corresponding to the historical image;
   determining, according to the initial quality scores, the quality score corresponding to the target video clip.

9. The method according to claim 8, wherein the determining, according to the initial quality scores, the quality score corresponding to the target video clip comprises any one of the following:
   determining an average value of the initial quality scores as the quality score corresponding to the target video clip;
   determining a maximum value of the initial quality scores as the quality score corresponding to the target video clip;
   determining a median of the initial quality scores as the quality score corresponding to the target video clip.

10. The method according to claim 8, wherein the historical quality score corresponding to the historical image is determined by at least one of the following:
    a fifth score determined according to a user's mark score for the historical image;
    a sixth score determined according to a resolution rate of the historical image, wherein the sixth score of the historical image is positively correlated with the resolution rate of the historical image;
    a seventh score determined according to a position of a third object in a screen of the historical image, wherein the seventh score of the historical image is negatively correlated with a distance between the third object in the historical image and a screen center of the historical image;
    eighth score determined according to a proportion of a fourth object to an entire screen in the historical image, wherein the eighth score of the historical image is positively correlated with the proportion of the fourth object in the historical image to the entire screen of the historical image.

11. A video processing apparatus, comprising:
    at least one processor; and
    a memory communicatively connected to the at least one processor; wherein,
    the memory stores instructions executable by the at least one processor, and the instructions are executed by the at least one processor, so that the at least one processor is configured to:
    divide a target video to obtain a target video clip;
    determine, according to video frame images contained in the target video clip, a quality score corresponding to the target video clip;
    display the quality score corresponding to the target video clip at a time position corresponding to the target video clip on a quality score display timeline, wherein the time position corresponding to the target video clip is a time position where the target video clip appears in the target video;
    wherein the target video is divided into a plurality of video clips comprising the target video clip;
    and the at least one processor is further configured to:
    in response to receiving an editing instruction for the target video, if the quality score, corresponding to the target video clip is higher than quality scores corresponding to other video clips in the target video, determine the target video clip as an alternative material for video splicing; and
    synthesize a plurality of alternative materials comprising the target video clip into a target spliced video.

12. The apparatus according to claim 11, wherein the at least one processor is further configured to:
    input a plurality of frames of target video frame images at different time positions in the target video and times when the plurality of frames of target video frame images appear in the target video into a slicing algorithm to acquire a target segmentation time point output by the slicing algorithm, wherein the slicing algorithm is obtained by training a machine learning algorithm with first training data, and the first training data comprises a first historical video and a historical segmentation time point for dividing the first historical video;
    divide, according to the target segmentation time point, the target video to obtain a plurality of video clips comprising the target video clip.

13. The apparatus according to claim 11, wherein the target video clip corresponds to a start segmentation time point and an end segmentation time point in the target video;
    and the at least one processor is further configured to:
    display cutting marks corresponding to the target video clip at the start segmentation time point and the end segmentation time point corresponding to the target video clip on the video editing timeline corresponding to the target video.

14. The apparatus according to claim 11, wherein the at least one processor is further configured to:
    input the video frame images contained in the target video clips into a first quality evaluation model to acquire the quality score corresponding to the target video clip, wherein the first quality evaluation model is obtained by training with second training data, and the second training data comprises a second historical video and a historical quality score corresponding to the second historical video.

15. The apparatus according to claim 11, wherein the at least one processor is further configured to:
input the video frame images contained in the target video clips into a second quality evaluation model respectively to acquire initial quality scores output by the second quality, evaluation model for each video frame image input into the second quality evaluation model, wherein the second quality evaluation model is obtained by training with third training data, and the third training data comprises a historical image and a historical quality score corresponding to the historical linage;
determine, according to the initial quality scores, the quality score corresponding to the target video clip.

16. A non-transitory computer-readable medium, on which a computer program is stored, wherein when the program is executed by a processing apparatus, the processing apparatus is caused to execute:

dividing a target video to obtain a target video clip;
determining, according to video frame images contained in the target video clip, a quality score corresponding to the target video clip;
displaying the quality score corresponding to the target video clip at a time position corresponding to the target video clip on a quality score display timeline, wherein the time position corresponding to the target video clip is a time position where the target video clip appears in the target video;
wherein the target video is divided into a plurality of video clips comprising the target video clip; and when the program is executed by the processing apparatus, the processing apparatus is further caused to execute:
in response to receiving an editing instruction for the target video, if the quality score corresponding to the target video clip is higher than quality scores corresponding to other video clips in the target video, determining the target video clip as an alternative material for video splicing; and
synthesizing a plurality of alternative materials comprising the target video clip into a target spliced video.

* * * * *